July 27, 1954  L. A. LASSMAN  2,684,590
SYSTEM FOR HYDROSTATICALLY TESTING HOLLOW BODIES
Filed Feb. 11, 1950  2 Sheets-Sheet 1
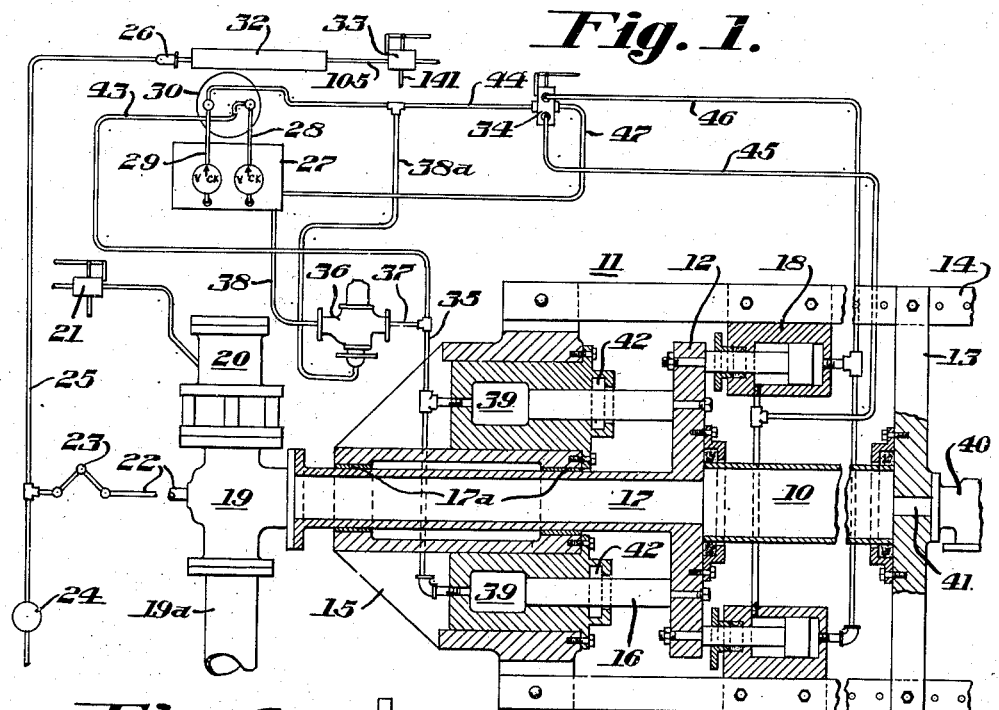
INVENTOR
LEO ARTHUR LASSMAN
by Hooper, Leonard & Glenn
his attorneys

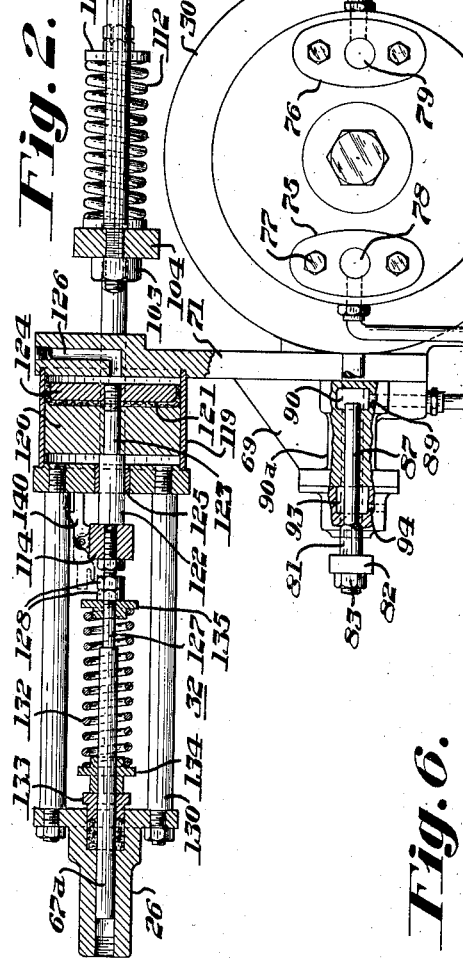

Patented July 27, 1954

2,684,590

UNITED STATES PATENT OFFICE 2,684,590

SYSTEM FOR HYDROSTATICALLY TESTING HOLLOW BODIES

Leo Arthur Lassman, Pittsburgh, Pa., assignor to Benjamin Lassman & Son, Pittsburgh, Pa., a partnership Application February 11, 1950, Serial No. 143,789

11 Claims. (Cl. 73—37)

This invention relates to a system for hydrostatically testing hollow bodies, such as metal or ceramic pipes and the like, by means of water or other relatively incompressible fluid. More particularly, this invention relates to means for controlling the application of the sealing and testing forces in said system within close limits of each other to avoid damaging any hollow body undergoing test substantially irrespective of the diameter, length or wall strength or thickness thereof. Further, this invention relates to the subject-matter of United States patent application Serial No. 53,162, filed October 7, 1948, for "System for Hydrostatically Testing Hollow Bodies."

In the testing of hollow bodies in pipe benches and similar devices, it is common at the present time to test at pressures in excess of 2500 lbs. per square inch, a figure which usually heretofore constituted the neighborhood of the upper testing pressure limit. Thus, it is not uncommon at the present time to find testing pressures which go as high as 6000 to 12,000 lbs. per square inch. As the upper testing pressure limit continues to increase in commercial practice, it is evident that more sensitive and closer synchronization between the application of the testing force and the counteracting sealing force exerted at the opening in the ends of the hollow body must be obtained. Further, the sealing force must be held within a close limit relative to the testing force. Otherwise, the hollow body undergoing test may be dangerously strained and may even fail. In addition to the hazard to personnel of such a failure, it may damage the machine and in any event will interfere with production. In a large mill such testing may be a continuous production operation, the consequences of the interruption of which may be quite costly.

The problems thus present especially at higher testing pressures are magnified when during such testing hollow bodies of varying internal diameters or differing wall strengths are processed. In the present tendency toward smaller safety factors in the manufacture of, for example, steel pipe, thin-walled pipe is particularly susceptible to crushing or impairment if oversealing is present during the testing. On the other hand, following the usual attempts heretofore made to closely correlate sealing and testing forces might result in undersealing and failure of the test operation. In addition, at the higher testing pressures especially hollow bodies in the longer lengths particularly were subject to bowing or waving during testing, resulting at least in part from the absence of close correlation of sealing and testing forces. As a consequence, it is common in prior testing benches and the like to provide clamps to encircle longer sections and assure the completion of the testing operation without such bowing.

In this invention sensitive and close correlation within narrow limits is obtained between the respective sealing and testing forces. Further, by means of this invention the sealing pressure and the testing pressure and the respective rates of application thereof may be so interrelated that prompt and continuous production testing at high pressures may be carried on even though there are frequent changes in the sizes or wall strengths of the hollow bodies undergoing testing.

Other objects and advantages of this invention will be apparent from the following description and the drawings, which are illustrative only, in which:

Figure 1 is a plan view, partly in cross section and partly schematic, of an apparatus particularly suitable for use in connection with this invention;

Figure 2 is a view in elevation and partly in cross section of an embodiment of this invention;

Figure 3 is a plan view of certain portions of the control apparatus shown in Figure 2;

Figure 4 is a view in end elevation of the apparatus shown in Figure 2;

Figure 5 is a view partly in cross section taken along line V—V of Figure 2; and Figure 6 is a view taken along line VI—VI of Figure 2.

*General arrangement and operation of test bench*

Referring to Figure 1 a test specimen in the form of a length of pipe 10 is placed in position in a test bench 11 between a sealing head or platen 12 and a rear sealing head 13. The rear sealing head 13 is held against rearward movement by tension bars 14. The rear sealing head 13 may be moved to different positions along the tension bars 14 when the pipe to be accommodated is of a different length than the existing setting of the bench. The sealing platen 12 is connected to a sealing housing 15 by sealing plungers 16 and a water prefilling tube 17 integral in this embodiment with sealing platen 12. The water prefilling tube 17 is slidably mounted in bearings 17a for axial movement through the sealing housing 15 and concentrically therewith.

On the other side of sealing platen 12 there are two hydraulic positioning cylinders 18 fastened to the tension bars 14 at the appropriate place for the testing of hollow body 10. At the rear end of the water prefilling tube 17, there is a water valve 19 actuated through an air cylinder 20 by an air valve 21. A low pressure water line 19a admits prefill water to valve 19, tube 17 and pipe 10 whenever valve 19 is opened by valve 21. A high pressure water line 22 with water therein at testing pressure is connected to the rear of valve 19 through a flexible pressure coupling 23. The testing pressure water is admitted to the testing pressure system through a valve 24. A line connection 25 in the high pressure water line of the testing liquid circuit leads into a testing circuit cylinder 26 whereby synchronization between the testing and sealing pressure systems is effected.

In the sealing liquid circuit a hydraulic fluid, such as oil is preferably used and is supplied from a tank 27. Such oil flows or is drawn either through line 28 or 29 and its check valve into a sealing pressure pump 30 which also possesses the features of reversible and variable delivery. Adjustable pressure pump 30 is a conventional type in which shifting the interior or working portions thereof to the left or right of the vertical center line through the axis of the pump produces discharge, respectively through the right or left port of the pump. The intake in each such case is respectively through the left or right port. The pressure of the pump discharge is selectively controlled in part by a pump control mechanism 32 having certain preadjusted springs therein and operating in conjunction with a synchronization cylinder 26 and an air valve 33.

The positioning cylinders 18 are double-acting and are operated hydraulically by the oil from pump 30 when a four-way hydraulic valve 34 is moved into the proper position. In bringing sealing platen 12 into engagement with pipe 10 by admitting oil into the rod end of cylinders 18 through pipe 45, sealing plungers 16 are withdrawn from sealing housing 15 and thereby their cylinders 39 are filled with oil from tank 27 through a pipe 35, valve 36 and pipe 37 and 38. When valve 33 is shut off, valve 34 is then turned to relieve the pressure in cylinders 18 and sealing plungers 16 take up the task of putting the sealing members into presealing engagement with pipe 10 at low pressure during the prefilling of pipe 10 with water. Thereafter plungers 16 hold sealing platen 12 against the pipe 10 at a much higher sealing pressure without any excessive or oversealing force against pipe 10 during the testing thereof under testing pressure. Plungers 16 and the bores of the cylinders 39 are made to very close tolerances, eliminating the need for packing and providing capillary lubrication of the plungers by the oil in the sealing pressure system without excessive loss or leakage of oil around the plungers. Oil which does pass out of the cylinders 39 is collected in chambers 42 for return to tank 27. Cylinders 39 are single-acting by the admission of oil thereto through pipes 43 and 35 under pressure for presealing and sealing in a closing or sealing engagement direction. Various of the valving and circuit connections to test bench 11 are more fully disclosed in the aforesaid United States patent application Serial No. 53,162 and are particularly suitable for use in the practice of this invention but no claim is made in this invention to the valving and circuit connections as such described in said application Serial No. 53,162.

In a testing operation on bench 11, front and rear sealing heads 12 and 13 and the positioning cylinders 18 are disposed in proper spaced relation on tension bars 14 to accommodate the succession of hollow bodies 10 to be tested. At the initiation of such a testing operation the test bench is open with plungers 16, tube 17 and platen 12 positioned to the left as viewed in Figure 1. Further, the sealing liquid circuit is either under no pressure if pump 30 has been stopped in neutral position, or it is under the pressure control of certain positioning pressure control springs in mechanism 32 as will hereinafter be described. The testing liquid circuit is under no pressure inasmuch as both the high pressure valve 24 and the low pressure valve 19 are normally closed at this stage. After placing a hollow body 10 between the sealing heads 12 and 13, pneumatic valve 33, if not in such position, is turned to admit compressed air to an air cylinder in mechanism 32 to cause pump 30 to discharge its hydraulic liquid into the sealing pressure circuit to close the bench when hydraulic valve 34 is turned to admit such liquid through lines 44 and 45 to the piston rod end of cylinders 18, thereby moving sealing head 12 into position to clamp hollow body 10 between it and sealing head 13, as shown in Figure 1, conventional ring seals being present on the respective heads. At the same time, such liquid is drawn into the cylinders 39 to fill them through lines 38, 37 and 35 because valve 36 is partially opened through the pressure exerted through line 38a as described in the aforesaid application, Serial No. 53,162.

Valve 21 is then moved to open valve 19 to admit low pressure water from a water line 19a into tube 17 and the interior of pipe 10 in the testing liquid circuit. A purge valve 40 is attached to head 13 and is normally open when testing bench 11 is open. As soon as the low pressure water from line 19a fills the testing liquid circuit and hollow body 10, water flows through opening 41 in sealing head 13 and open valve 40 in a solid stream, generally indicating that all of the air in pipe 10 has been substantially expelled, whereupon valve 40 is closed. At the time of the admission of low pressure water to pipe 10 valve 33 is shut off to connect the air cylinder in mechanism 32 to the exhaust port of valve 33, permitting mechanism 32 to cause pump 30 to deliver liquid through lines 43 and 35 into the sealing liquid circuit at an appropriate presealing pressure. Valve 34 is also shifted when valve 33 is shut off so that the relief at the head end of cylinders 18 may take place through lines 46 and 47.

When the prefilling operation is completed and valve 40 is closed, valve 19 is also closed to shut off the low pressure water supply and valve 24 is opened to admit high pressure water to the testing liquid circuit. Immediately such testing pressure is operative upon testing circuit cylinder 26, mechanism 32 and the balance of the pump control assembly to cause pump 30 to deliver liquid through pipes 43 and 35 into cylinders 39 at sealing pressure. The sealing force exerted by the sealing pressure is maintained above but very close to the testing force exerted by the testing pressure so that sealing is assured. And even though pipe 10 foreshortens under the force of the testing pressure, the sealing force will cause sealing head 12 to "creep" or move forward correspondingly and maintain the sealed relationship.

When the test is over, valve 24 is closed and valve 40 is opened to abate the pressure in the testing circuit. At the same time, valves 33 and 34 are turned to reintroduce compressed air into the air cylinder in mechanism 32 and supply liquid in the sealing liquid circuit under pressure to the piston head end of cylinders 18 through lines 44 and 46. Thereby sealing head 12 is moved away from sealing head 13 with the cylinders 39 being exhausted through line 35, valve 36 and line 38 while the opposite ends of cylinders 18 are relieved through line 45, valve 34, and line 47. The pump 30 will shut off automatically, even though valve 33 is not turned off after test bench 11 becomes fully opened, when the force exerted by springs 112 is balanced by the force resulting from pressure in line 89a against plunger 87.

Between testing periods on test bench 11 a latch 140 may be swung into the position shown in Figure 2 to hold crosshead 114 at the non-pumping distance from cylinder head 118 against the pressure of presealing control spring 132. This use of latch 140 allows the operator during such inactive periods to shut valve 33 off so that no compressed air passes into pipe 105. During the operations of test bench 11, latch 140 is swung over and maintained in the dotted position shown in Figure 3.

*Pump and associated control mechanism*

This adjustable pressure pump 30 comprises a casing 68 rigidly bolted to a suitable foundation. Brackets 69 and 70 are bolted respectively to the left and right sides of casing 68. These brackets carry arms 71 and 72, respectively, to support pump control mechanism 32. A rigid depending slideway 50 is also bolted to casing 68 below arm 72 and adjustably carries a sealing pressure cylinder assembly 51 which is a part of this invention. At the front of pump 30 there is a cover plate 73 and a similar suitable cover plate 74 at the rear to enclose the pump. Threaded connection plates 75 and 76 are bolted by bolts 77 in concentric position about a left-hand port 78 and right-hand port 79, respectively, of the pump. In the operation of pump 30, which is of a well-known commercial type, when port 78 is the intake port, port 79 is the discharge port. Conversely, when port 79 is the intake or suction line, port 78 is the discharge port.

In this type of pump, motive power is supplied through a shaft 80 journaled in bearings enclosed within the casing of the pump and not shown. Pump 30 operates in such fashion that when the working elements thereof are laterally shifted to the left, port 79 becomes the discharge port and when the working parts are shifted to the right, port 78 becomes the discharge port. The maximum extent of any movement of the working parts to the left or right of the vertical center line through the axis of the pump is limited by internal stops within the pump 30. When the internal slidable working parts of the pump are concentric with shaft 80, the pump is in neutral position and no pumping action is obtained.

These laterally shiftable interior parts of the pump are rigidly affixed to a pair of guide rods 81 extending to the left through casing 68. Guide rods 81 are connected to a crosshead 82 by nuts 83. On the right, a similar pair of guide rods 84 extend through casing 68 and are connected to a crosshead 85 by nuts 86. A saddle 85a is made integral with crosshead 85 and spans the edge of a balance lever 98 to which it is pivotally connected by a pin 85b passing through a short vertical slot 98a. There is a close fit between pin 85b and slot 98a in the plane of movement of guide rods 84. Thus, in effect, crossheads 82 and 85 are themselves rigidly connected together.

Within a pressure cylinder 90a in the lower part of bracket 69, a plunger 87 is located for actuation away from the pump 30 by the introduction of oil under pressure through a line 89a and port 89 into a chamber 90 in cylinder 90a whenever discharge from port 78, into which pipe 89a is tapped, takes place. Plunger 87 is located in the plane of the pair of guide rods 81 and operates parallel thereto and midway between them. Moreover, plunger 87 abuts the inside of crosshead 82. This plunger 87 is lubricated by capillary action of the actuating fluid in the sealing pressure system entering chamber 90 and working between the plunger and the bore of cylinder 90a without undue loss or leakage of oil. Such oil as does work through the bore is collected in an oil-collecting chamber 93 and returned through an opening 94 to tank 27 by a suitable line.

The sealing liquid circuit pressure cylinder assembly 51 is adapted to slide vertically in slideway 50 and generally in a plane parallel to guide rods 84 and midway between them. Slideway 50 comprises a vertical machined plane surface 52 and a pair of guide strips 53 on each side thereof bolted to surface 52. The outermost strip 53 is wider than the innermost on each side and extends inwardly to form vertical grooves 54 which operate as a track in which assembly 51 slides. A carriage plate 55 is provided with side flanges 56 engaging the respective grooves 54 to retain carriage plate 55 in slidable relation against surface 52. Plate 55 is drilled at 57 for a press fit with or other suitably firm attachment to a sealing pressure cylinder 58. A port 59 affords access to a chamber 60 at the inner end of a cylinder bore 61 in a bore sleeve 61a tightly held by a plate 61b within cylinder 58. A flexible pressure hose 62 received liquid from the sealing liquid circuit through its connection to port 79 during discharge from port 79 to urge a piston 63 in bore 61 outwardly and horizontally. The axis of piston 63 lies within the vertical plane parallel to and midway between guide rods 84. An oil-collecting chamber and return port may be provided for cylinder 58 on the outer end thereof corresponding to the same provision made for cylinder 90a since piston 63 is also made with a capillary fit between it and the walls of bore 61.

Piston 63 is axially recessed at 64 on its outer end for the reception of an easy fitting stem 65 extending rearwardly of and integral with a shoe 66. A horizontal contact bar 67 is provided on the outermost face of shoe 66 in order to provide substantially line contact between shoe 66 and a balance lever 98. Shroud plates 97 are bolted to the sides of lever 98 to form a channel between the flanges of which shoe 66 and bar 67 will be confined and travel during any movement thereof. Calibration markings 106 may be provided on one or both shrouds 97 so that an operator through an adjusting screw rod 88 may promptly change the vertical setting of sealing pressure cylinder assembly 51 to suit a change in the diameter of the pipe specimens being tested.

Adjusting screw rod 88 is mounted and suitably packed for rotary but not axial movement in a bearing 91 integral with bracket 70. A handwheel 92 fitting over the squared end of rod 88 provides for the necessary rotation thereof to adjust pressure cylinder assembly 51 to any predetermined height. An adjustment nut 95 is bolted to carriage plate 55 and engages the threads on rod 88 so that upon turning of handwheel 92, plate 55 and assembly 51 are correspondingly raised or lowered, depending upon the direction of rotation of the handwheel. A stud bolt 107 may be threaded into the back of cylinder 58 with its stem passing through a slot 107a in slideway 50 so that turning bolt 107 to tighten it, after assembly 51 has been moved to its appropriate predetermined location, will insure the locking of assembly 51 in place and prevent any inadvertent vertical movement thereof.

Lever 98 fits between the sides of saddle 85a and is pivotally fulcrumed at 99 to bracket arm 72. The upper end of lever 98 is pivotally connected to and journaled between the sides of a clevis 100. Clevis 100 is fixedly attached to a control rod 101 extending inwardly thereof toward and above pump 30. The inner end of rod 101 is shouldered and threaded as indicated at 102 for fixed engagement with a crosshead 104. A nut 103 locks control rod 101 in place with relation to crosshead 104.

Crosshead 104 operates in a horizontal plane and at the respective outer ends thereof is engaged by a pair of spacing bolts 108. The narrower extended ends 109 of spacing bolts 108 slidably pass through holes drilled through crosshead 104 and act as spring rods slidable relative to crosshead 104. The outer ends of the spring rods 109 are threaded for the reception of lock nuts 110. Between crosshead 104 and the lock nuts 110 there are respectively located on each spring rod 109 a spring retainer 111, a spring 112 and a second spring retainer 113. Across the innermost ends of the spacing bolts 108 there is a crosshead 114 which is fixedly connected thereto by the nuts 115. Spacing bolts 108 also freely extend through bushing lined openings 116 in arm 71 and openings 117 in a cylinder head 118.

An air cylinder 119 is positioned between arm 71 and cylinder head 118. In air cylinder 119 there is a piston 120 and a fibrous piston facing disc 121. A piston rod 122 has a stud shoulder portion 123 the inner end of which is threaded into a piston follower 124 to connect piston rod 122 to piston 120. Piston rod 122 extends through a bushing 125 in cylinder head 118 and abuts against the inner, that is the right side as shown in Figure 2, of crosshead 114. Cylinder 119 is single acting and operates by compressed air entering the cylinder through port 126 when air valve 33 is turned to admit compressed air into line 105. Extending outwardly of crosshead 114 intermediate the ends thereof is a stud shaft 127, the inner end of which is threaded for engagement with the crosshead 114 and for engagement with adjusting nuts 128.

Synchronization cylinder 26 has a piston 67a therein which is coaxial with and normally abuts the outer end of stud shaft 127. Cylinder 26 is maintained in position relative to the pump control mechanism 32 by spacing bolts 130 respectively threaded into cylinder head 118 at their inner ends. Cylinder head 118 in turn is maintained in position relative arm 71 by the bolts 131.

A packing gland 133 using conventional packing is bolted to cylinder 26 and prevents leakage of the high pressure testing fluid around plunger 67a. Between the packing gland 133 and the adjusting nuts 128, a spring 132 is positioned at the respective ends of which suitable retainers 134 and 135 are provided. Hence, by means of adjusting nuts 128 the loading of spring 132 can be varied for the purpose of effectively and automatically presealing the test specimen with the correct amount of presealing force during the prefilling stage of the testing cycle.

Operation of pump control assembly

In initiating a new testing cycle, valve 33 is turned to admit compressed air into line 105 and thence into air cylinder 119 through port 126. Thereby, guide rods 81 are moved to the right as viewed in Figure 2 causing discharge from port 78 to close test bench 11 through the proper setting of valve 34 against a newly positioned pipe length 10. This closing of test bench 11 is under the control of springs 112 which are set at an appropriate back pressure to insure closure without any crushing of pipe 10. Thus, even if the operator should fail to shut valve 33 off at the moment of achieving the proper closure relation between test bench 11 and pipe 10, no damage is done because when the hydraulic liquid in the sealing pressure system attains a predetermined pressure, the force exerted thereby on plunger 87 will restore pump 30 to neutral, non-pumping position by the pull exerted through lever 98, rod 101, crosshead 104 and spring retainers 113 on the springs 112.

With the test bench 11 closed on a pipe 10, valve 33 is then turned to shut-off position and relieves cylinder 119 through port 126, line 105 and exhaust line 141. Thereupon, spring 132 assumes control for presealing pushing crosshead 114, and thereby control rod 101, to the right as shown in Figure 2. This causes a corresponding movement of guide rods 84 to the left, initiating discharge from port 79 of pump 30. The pressure of such discharge will be controlled by the compression of spring 132 by the adjusting nuts 128. Thereby the presealing force exerted by the pressure of the sealing circuit liquid against plungers 16 will be determined by spring 132 during the prefilling of pipe 10 with water admitted into valve 19 from line 19a.

When the hollow body undergoing test is filled with water and valve 40 is closed, the apparatus is ready for the application of full testing and sealing pressures and forces. It is at this juncture of the testing cycle that the sensitive relation of sealing force to testing force must be obtained particularly with thinner walled specimens or those whose length increases the slenderness ratio to the point where unbalanced sealing and testing forces may either crush or bow or damage the test specimen. While the sealing force is always to be maintained greater than the testing force, the difference between such forces must be held within narrow limits during the increase in each thereof from the starting forces to the maximum effective in the particular testing cycle. It is the close correlation of the two forces during the pressure testing stage of the testing cycle that is sensitively obtained by and especially important in the system of this invention.

At the present time, testing pressure exerted by the liquid, usually water, in the testing pressure system at the testing stage may run as high as 12,000 lbs. per square inch. On the other hand, the pressure of the liquid in the sealing liquid system, which pressure is derived from pump 30 as a pressure source, may remain at a much lower figure such as, for example, 2500 lbs. per square inch, maximum sealing pressure. The sealing and testing forces, corresponding to the area over which such pressures are respectively applied multiplied by such pressures respectively, may, however, be placed in sealing balance by the practice of this invention regardless of changes in the sizes of the hollow bodies undergoing test and regardless of the close margin afforded the operator by the respective column strengths thereof.

In the testing stage of the testing cycle in the preferred embodiment of this invention, liquid at the sealing or delivery pressure at port 79 passes through line 62 and urges piston 63 against lever 98 through the horizontal line contact afforded by bar 67. This actuation tends to return lever 98 to its vertical, that is, its neutral or non-pumping position. The force exerted by piston 63 is rigidly opposed by control rod assembly 101 which is directly and rigidly acted upon by piston 67a in cylinder 26. Because of the characteristics of pump 80 the movements of piston 67a reflecting a change in the pressure of the testing liquid in the testing circuit are immediately reflected by a corresponding change in the rate or build-up of sealing pressure of the liquid discharged from port 79 and vice versa. The proportion of the cross sectional areas of the respective pistons 63 and 67a, taken together with the characteristics of the respective pressure sources for the respective liquids in the independent sealing and testing circuits are such that in the testing stage of the testing cycle the testing force against sealing head 12 to open it cannot exceed the sealing force exerted on the cross sectional areas of the plungers 16. Conversely, such sealing force cannot so "outrun" the testing force as to give rise to the risk of crushing or bowing the pipe 10.

Such continual and close correlation and balance between sealing and testing forces is obtained by the predetermined positioning of sealing pressure cylinder assembly 51, for a given diameter of pipe lengths 10 to be tested, along the slideway 50 so that under the effect of the predetermined testing pressure to be applied to specimens of that diameter the respective moments of force exerted on lever 98 to rotate it about its fulcrum 99 act and will remain in sealing balance throughout the testing stage at high pressure. When the internal diameter of the hollow bodies 10 are changed, it is a simple task, even in continuous production testing, to loosen bolt 107 and turn handwheel 92 to shift assembly 51 to a new predetermined sealing balance position using the calibration markings 106.

Thus, by way of example and not by way of limitation, the following illustrations will show the magnitude of some of the respective testing and sealing forces which may be kept in proper and continuous balance by the practice of this invention:

*Example 1.*—In testing a 7-inch outside diameter steel pipe having a cross sectional area of 38½ sq. in. to 5000 lbs. per sq. in. internal pressure, the pipe being sealed on its outside diameter, a total testing force of 192,500 lbs. is developed tending to separate sealing heads 12 and 13. On the basis that plungers 16 each have a cross sectional area of 55 sq. in., the sealing pressure required will be 1750 lbs. per sq. in. If plunger 67a has a cross sectional area of 1 sq. in., it will exert a force of 5000 lbs. against rod 101 under the applied test pressure of 5000 lbs. per sq. in. If plunger 63 has a cross sectional area of 2 sq. in., it develops a force of 3500 lbs. under the sealing pressure of 1750 lbs. per sq. in. required. Therefore, to balance the sealing force against the testing force, if the distance from clevis 100 to pivot 99 is 4 inches, plunger 63 must be placed so as to act against lever 98 a distance of 5.72 inches from pivot 99.

*Example 2.*—On the basis of the specimen and dimensions set forth in Example 1 but when applying a test pressure 3000 lbs. per sq. in. internal pressure, a testing force is developed of 115,500 lbs. tending to separate sealing heads 12 and 13. The balancing sealing pressure must therefore be 1045 lbs. Plunger 67a exerts a force of 3000 lbs. under the conditions of this Example 2 and plunger 63 exerts a force of 2090 lbs. Therefore, plunger 63 must remain at 5.72 inches from pivot 99, thereby illustrating that in the practice of this invention no new setting of assembly 51 is required for changes in the full testing pressure to be applied.

*Example 3.*—In testing a pipe of 4½ inches outside diameter having a cross sectional area of 16 sq. in., and on the basis of the same test bench apparatus dimensions set forth in Example 1, plunger 63 must be reset for any applied testing pressure to a distance along lever 98 13¾ inches distant from pivot 99.

It is evident that various modifications in the proportions of the parts and in their positioning and in the characteristics of the respective pressure sources and in the liquid circuits may be made without departing from the spirit of this invention or the scope of the appended claims.

I claim:

1. In a system for hydrostatically testing hollow bodies and having independent sealing liquid and testing liquid circuits with a pressure source for each of said circuits, displacement means acted upon by the pressure in said sealing liquid circuit, displacement means acted upon by the pressure in said testing liquid circuit and engaging said first-mentioned displacement means, lever means engaged by said displacement means at respective distances along said lever means for balancing the respective forces exerted by said respective displacement means, and means for varying the distance along said lever means of at least one of said displacement means, whereby the sealing force exerted by the pressure in said sealing liquid circuit is maintained in close sealing balance with the testing force exerted by the pressure in said testing liquid circuit.

2. In a system for hydrostatically testing hollow bodies having sealing pressure and testing pressure circuits, lever means having a fulcrum, means responsive to sealing pressure bearing against said lever means a predetermined distance from said fulcrum and adapted to turn said lever means thereabout in one direction, means responsive to testing pressure bearing against said lever means a predetermined distance from said fulcrum and adapted to turn said lever means thereabout in a direction counter to said first-mentioned direction, and means to vary the distance of at least one of said bearing means from said fulcrum, whereby the sealing force exerted by said sealing pressure may be maintained in closely correlated and balanced synchronism with the testing force exerted by said testing pressure.

3. In a system for hydrostatically testing hollow bodies employing a conventional hydraulic sealing pressure pump, sealing pressure means for returning said pump when pumping to a neutral non-pumping position when sealing pressure is attained, testing pressure means opposing such return, and lever mechanism connecting said respective means in adjustable relation to at least one of said means by varying the distance of said last-mentioned means along said lever mechanism, whereby the force exerted by said testing pressure means is adapted to be sensitively and continuously balanced by the force exerted by said sealing pressure means.

4. In a system having sealing and testing liquid circuits for hydrostatically testing hollow bodies, pressure sources for the liquids in said circuits, displacement members respectively acted upon by said sources, said displacement members being in rigid engagement opposed to each other, and means respectively engaged by said displacement members to move them in relation to one another to maintain said system in balanced sealing relation between the sealing and testing forces exerted by said pressure sources.

5. In a system for hydrostatically testing hollow bodies and having independent sealing liquid and testing liquid circuits with a pressure source for each of said circuits, piston means acted upon by the pressure in said sealing liquid circuit, piston means acted upon by the pressure in said testing liquid circuit and engaging said first-mentioned piston means in an opposed manner, means for changing the pressure of at least one of said pressure sources to balance the respective forces exerted by said respective piston means, and means for shifting at least one of said piston means relative to the other and in a non-axial direction relative to itself, whereby the sealing force exerted by the pressure in said sealing liquid circuit is adapted to be maintained in close sealing balance with the counteracting testing force exerted by the pressure in said testing liquid circuit for different sizes of such hollow bodies.

6. In a system for hydrostatically testing hollow bodies employing a conventional hydraulic sealing pressure pump, sealing pressure means for returning said pump when pumping to a neutral non-pumping position when sealing pressure is attained, testing pressure means in engagement with said sealing pressure means to oppose such return, lever means engaging said pump and adapted by its movement to vary the pressure thereof, said lever means connecting said respective pressure means about a fulcrum, and means for adjusting the leverage ratio between said means measured from said fulcrum, whereby the force exerted by said sealing pressure means is adapted to be sensitively and continuously kept in balance about the fulcrum of said lever means with the force exerted by said testing pressure means for different sizes of such hollow bodies.

7. In a system for hydrostatically testing hollow bodies having sealing pressure and testing pressure circuits, at least one of said circuits having a variable pressure source, lever means engaging said pressure source and adapted by its movement to vary the pressure of said pressure source, said lever means having a fulcrum, means responsive to sealing pressure bearing against said lever means a predetermined distance from said fulcrum and adapted to turn said lever means thereabout in one direction, means responsive to testing pressure bearing against said lever means a predetermined distance from said fulcrum and adapted to turn said lever means thereabout in a direction counter to said first-mentioned direction, and means for relatively adjusting said pressure responsive means to change the respective ratio between said predetermined distances to compensate for a change in the cross sectional area of the hollow bodies being tested, whereby by the balancing of said two first-mentioned means about said fulcrum the sealing force exerted by said sealing pressure may be maintained in close correlated synchronism with the testing force exerted by said testing pressure.

8. In a system for hydrostatically testing hollow bodies having independent sealing liquid and testing liquid circuits, a hydraulic pump adapted to act as a pressure source for said sealing liquid circuit, a working member in said pump adapted to be movable between a neutral non-pumping position and a full volume discharge position, a lever pivotally connected to said working member, said lever having a fixed fulcrum relative to said pump, a control rod assembly pivotally connected to said lever, a testing circuit piston in said testing liquid circuit adapted to be acted upon by the pressure in said testing liquid circuit, said control rod assembly being in direct thrust engagement with said testing circuit piston, a pressure cylinder assembly in said sealing liquid circuit, a piston in said pressure cylinder assembly adapted to bear against said lever and exert a moment of force about said fulcrum counter to the moment of force about said fulcrum exerted by said testing circuit piston through said control rod assembly, said pressure cylinder assembly being positioned at a predetermined distance from said fulcrum, whereby the sealing force during testing in said system is sensitively and continuously maintained in sealing balance relative to the testing force in said system.

9. In a system having sealing and testing circuits for hydrostatically testing hollow bodies, a hydraulic pump adapted to act as a pressure source for said sealing circuit, a working member in said pump adapted to be movable between a neutral non-pumping position and a full volume discharge position, a lever pivoted adjacent to said pump and engaged by said working member, a pressure cylinder positioned adjacent said pump and adapted to be actuated by the discharge therefrom, a piston in said pressure cylinder rigidly engaging said lever in such a manner as to tend to move said working member into neutral non-pumping position, a second pressure cylinder in said system adapted to be actuated by the pressure in said testing circuit, a second piston in said second pressure cylinder rigidly engaging said lever in a manner as to tend to move said working member into full volume discharge position, and means for balancing the forces respectively exerted by said pistons, whereby the sealing force against a hollow body during the operation of said system is adapted to increase in synchronism with the testing force to effect sealing and take-up caused by any foreshortening of said hollow body without impairing the strength of said hollow body.

10. In a system for hydrostatically testing hollow bodies on a test bench having relatively movable heads, a sealing pressure pump having variable and reversible discharge, resilient means controlling one of the discharges from said pump for opening and closing said test bench, a second resilient means for controlling another discharge from said pump for presealing said testing bench against a hollow body to be tested, a testing pressure pressure source, a plunger in said testing pressure pressure source in rigid engagement with said pump to cause said pump to discharge at sealing pressure, a second plunger acted upon by said sealing pressure in rigid engagement with said first-named plunger to oppose the force exerted by said first-named plunger on said pump, a balance lever acted upon by said respective plungers in said engagement, and means for shifting at least one of said plungers relative to said balance lever to equalize the forces exerted by said respective plungers, whereby for different cross sectional areas of pipe tested on said test bench, the sealing force exerted between the heads of said test bench may be maintained in sealing balance without oversealing relative to the testing force exerted by the testing pressure within said hollow body.

11. An apparatus of the class described comprising a fluid pressure mechanism, a seal actuated by said mechanism for sealing a hollow article to be tested, a source of pressure fluid connected to the interior of said article, a variable delivery pump delivering hydraulic fluid to the mechanism for actuation thereof, a device operatively connected to the pump for varying the delivery of said pump, and another device connected to said source and operated by the pressure therefrom through a relatively incompressible connection to control the first-mentioned device, for automatically increasing the pressure of hydraulic fluid delivered by said pump in direct proportion to increase of pressure in said article by fluid from said source.

References Cited in the file of this patent

UNITED STATES PATENTS

| Number | Name | Date |
|---|---|---|
| 2,326,345 | Ernst et al. | Aug. 10, 1943 |
| 2,329,035 | Cross | Sept. 7, 1943 |
| 2,520,856 | Schowalter | Aug. 29, 1950 |
| 2,522,927 | Camerota | Sept. 19, 1950 |